Patented Oct. 4, 1949

2,483,693

UNITED STATES PATENT OFFICE 2,483,693

ALKYL N-(ORTHO-BICYCLOHEXYL)-CARBAMATES

Elmer H. Dobratz, Clayton, Mo., assignor to Monsanto Chemical Company, St. Louis, Mo., a corporation of Delaware No Drawing. Application October 30, 1948, Serial No. 57,630

5 Claims. (Cl. 260—468)

This invention relates to novel esters of carbamic acid. More particularly, this invention relates to certain novel alkyl esters of N-(ortho-bicyclohexyl)-carbamic acid.

Prior to this invention, N-(o-bicyclohexyl)-carbamic acid and derivatives of N-(o-bicyclohexyl)-carbamic acid were compounds unknown and unexpected by the art. I have now discovered that many of the derivatives of N-(o-bicyclohexyl)-carbamic acid, and in particular certain alkyl esters of N-(o-bicyclohexyl)-carbamic acid, evidence promise of unexpected utility in many industrial arts such as, the modification of synthetic resins and the control of fungi, bacteria, and insects. It is an object of this invention, therefore, to provide a new class of esters, namely, certain alkyl N-(o-bicyclohexyl)-carbamates, which have been found to have utility as modifiers and extenders for various synthetic resinous compositions and also as fungicides, insecticides and bactericides. The physical and chemical characteristics of the esters of this invention permit them to be formulated with various solid carriers for use as insecticidal and fungicidal dusts and in solutions and emulsions for insecticidal sprays.

This and other objects are accomplished by the invention herein described which provides certain alkyl N-(o-bicyclohexyl)-carbamates having the formula:

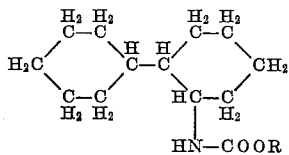

wherein R is an alkyl group having at least one and not more than 12 carbon atoms.

Typical of the alkyl N-(o-bicyclohexyl)-carbamates of this invention are the methyl, ethyl, propyl, isopropyl, butyl, isobutyl, sec.-butyl, tert.-butyl, amyl, isoamyl, hexyl, 2-ethylbutyl, 2-methylpentyl, heptyl, n-octyl, capryl, 2-ethylhexyl, nonyl, decyl, 2-propylheptyl, and dodecyl N-(o-bicyclohexyl)-carbamates.

The novel compounds of this invention may be conveniently prepared by reacting 1 mol of o-amino bicylohexyl with a slight molecular excess of an alkyl chlorocarbonate in a sodium hydroxide solution at elevated temperatures. The reaction proceeds smoothly, and is strongly exothermic. The oil layer formed is washed with dilute sulphuric acid followed by several water washes. The wet ester is then dehydrated under vacuum.

The novel products of this invention, and the manner of their preparation are illustrated by the following examples which are indicative of the manner of preparation of several of the alkyl N-(o-bicyclohexyl)-carbamates which are within the scope of this invention.

EXAMPLE I

*Ethyl N-(ortho-bicyclohexyl)-carbamate*

271 grams of o-amino bicyclohexyl and 66 grams of sodium hydroxide was stirred in 330 grams of water contained in a suitable flask provided with agitation. 170 grams of ethyl chlorocarbonate was slowly added over a period of one hour to the reaction mass, while maintaining a temperature in the range of 60° to 80° C. After all the ethyl chlorocarbonate had been added, the reaction mass was agitated for approximately one hour while maintaining a temperature of 95° to 100° C. The aqueous layer was allowed to separate and the ester layer was washed with 300 grams of 5% sulphuric acid solution at 70° C. This was followed by two successive water washes. The wet ester was then dehydrated under an absolute pressure of 50 to 60 mm. mercury at a temperature of 150° C. The ethyl N-(o-bicyclohexyl)-carbamate was obtained in a yield of 96% based on o-amino bicyclohexyl. It was a viscous colorless liquid having a boiling point of 136° C. at 0.2 mm. Hg absolute pressure.

EXAMPLE II

*Butyl N-(ortho-bicyclohexyl)-carbamate*

270 grams of o-amino bicyclohexyl was added to 300 ml. of 18% sodium hydroxide solution and heated to 60° to 80° C. with the gradual addition over a period of one hour of 198 grams of butyl chlorocarbonate. The reaction mass was heated with agitation for one hour at 90° to 100° C. The aqueous layer was separated and the ester layer washed with a dilute sulphuric acid solution, followed by successive water washes. The wet ester was then dehydrated under vacuum and the dry butyl N-(o-bicyclohexyl)-carbamate obtained.

EXAMPLE III

*2-ethylhexyl N-(ortho-bicyclohexyl)-carbamate*

270 grams of o-amino bicyclohexyl was added to 300 ml. of an 18% sodium hydroxide solution. 254 grams of 2-ethylhexyl chlorocarbonate was added to the reaction mixture over a period of one hour while maintaining with agitation a temperature in the range of 60° to 80° C. After all the 2-ethylhexyl chlorocarbonate had been added, the reaction mass was heated to 95° to 100° C. and maintained at this temperature with agitation for a period of one hour. The aqueous layer was separated and the ester layer washed and purified according to the procedure set forth in the preceding examples thereby obtaining 2-ethylhexyl N-(o-bicyclohexyl)-carbamate.

EXAMPLE IV

*Dodecyl N-(ortho-bicyclohexyl)-carbamate*

270 grams of o-amino bicyclohexyl was added to 300 ml. of an 18% sodium hydroxide solution. The mixture was heated to 60° to 80° C. with agitation and 310 grams of dodecyl chlorocarbonate added over a period of one hour. The reaction mixture was then maintained at 95° to 100° C. for one hour with agitation. The aqueous layer was allowed to separate and the ester was purified in the manner heretofore described, thereby, obtaining dodecyl N-(o-bicyclohexyl)-carbamate.

Having set forth in particular detail the novel products of this invention together with their manner of preparation,

What is claimed is:

1. As new chemical compounds, the alkyl N-(o-bicyclohexyl)-carbamates of the type,

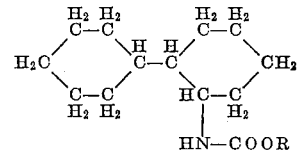

wherein R represents an alkyl radical containing at least one and not more than 12 carbon atoms.

2. As a new chemical compound, ethyl N-(o-bicyclohexyl)-carbamate.

3. As a new chemical compound, butyl N-(o-bicyclohexyl)-carbamate.

4. As a new chemical compound, 2-ethylhexyl N-(o-bicyclohexyl)-carbamate.

5. The process comprising reacting o-amino bicyclohexyl with an alkyl chlorocarbonate, wherein the alkyl group contains at least one and not more than 12 carbon atoms, in the mol ratio of substantially 1:1 in the presence of an aqueous sodium hydroxide solution at a temperature of substantially 60° to 100° C.

ELMER H. DOBRATZ.

No references cited.